UNITED STATES PATENT OFFICE.

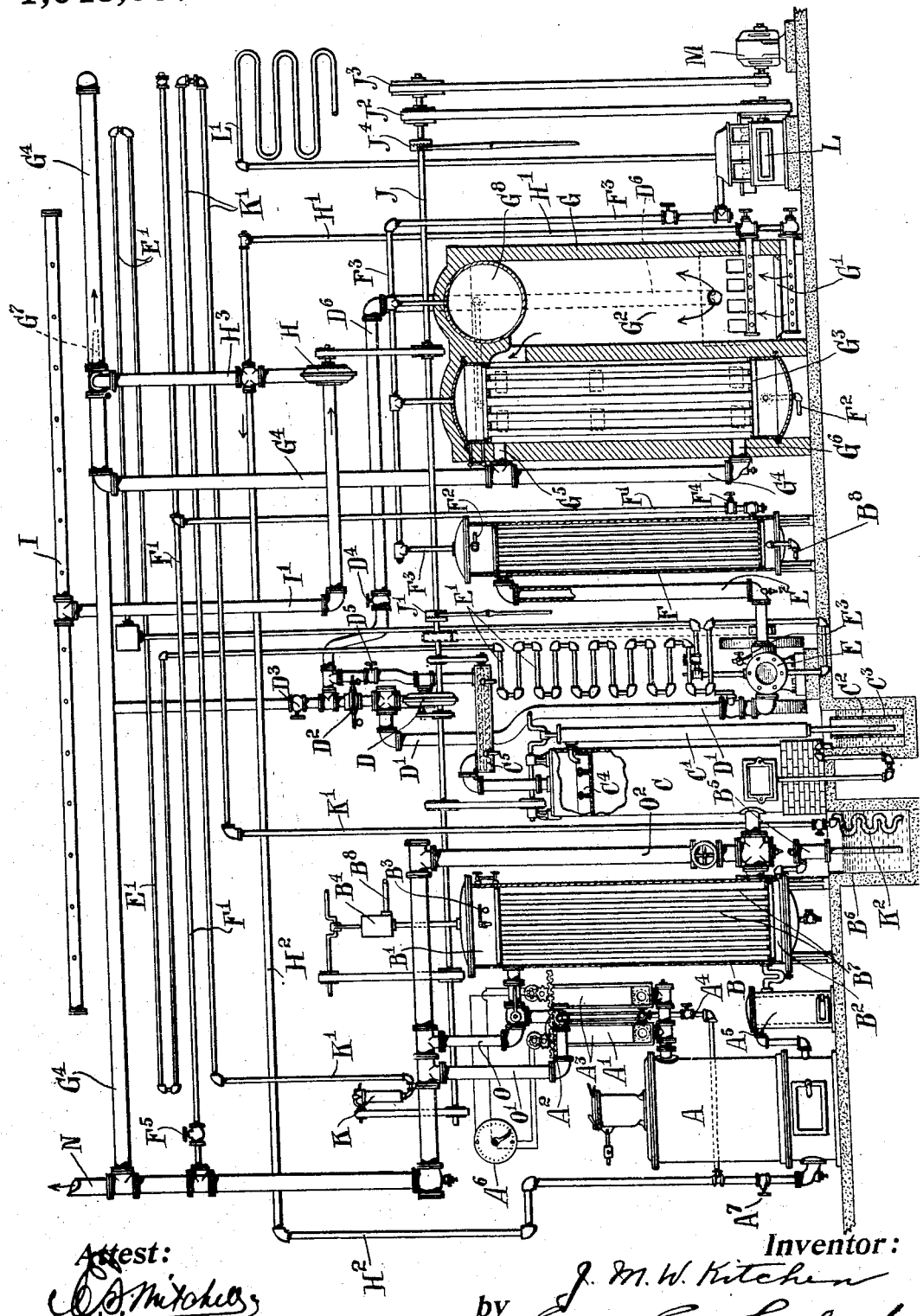

JOSEPH MOSES WARD KITCHEN, OF EAST ORANGE, NEW JERSEY.

MEANS FOR ECONOMIZING HEAT IN POWER PLANTS.

1,043,847.  Specification of Letters Patent.  Patented Nov. 12, 1912.

Application filed March 23, 1910. Serial No. 551,196.

*To all whom it may concern:*

Be it known that I, JOSEPH MOSES WARD KITCHEN, a citizen of the United States, residing at city of East Orange, county of Essex, State of New Jersey, have invented certain new and useful Improvements in Means for Economizing Heat in Power Plants, of which the following is a specification.

The object of the invention is to reduce the fuel costs of power generation through the use of the lowest cost fuel; to secure a cleaner fuel gas; to modify and control the peculiar actions of the internal combustion engine; to economize low degrees of heat wastes; and to use steam power and gas power compositely in connection with the generation of motive power and of the electric current and in connection with heating.

The present invention is an evolutionary advance on the inventions described and claimed by me in co-pending applications: Serial No. 415,983, filed Feb. 14, 1908; Serial No. 453,275, filed Sept. 16, 1908; Serial No. 460,267, filed Dec. 4, 1908; Serial No. 482,127, filed March 8, 1909; Serial No. 487,694, filed Apr. 3, 1909; Serial No. 504,132, filed June 24, 1909; and Serial No. 504,778, filed June 28, 1909.

Subject matter is herein disclosed which is not herein claimed, but which is more or less claimed in each of the cited applications.

The present invention is a system comprised of co-acting elements comprising among other features: (A) a fuel gas producer, (B) a tar destructor, (C) a tar vaporizer, (D) a gas cooler and tar condenser, (E) a water refrigerating device, (F) a scrubber, (G) a gas washer and centrifugal exhauster and blower, (H) a jacket water cooler, (I) an economizer of the heat of exhaust engine gases, (J) a steam generator, (K) a system for economizing radiated heat, (L) an induced draft controller, (M) a steam motor, (N) means for unifying the motive power generated, and (O) an electric generator.

The more important principles applied in the invention are as follows: 1. To generate a low cost fuel gas and secure motive energy from the burning of the gas in the internal combustion engine. 2. To modify and control the immoderate, intractable and undependable energy of the internal combustion engine by means of steam power separately generated and exercised. 3. To operate and control the gas generating and other motored elements required in operating the plant, by motive power generated separate and apart from the motive activity of the internal combustion engine or principal motor of the system. 4. To economize some of the heat wastes of gas generation and gas burning in heating water and economizing other heat wastes, by transferring the waste heat to air for combustion, and utilizing the heated air in the burning of solid fuel for the highest heating of water and the generation of steam. 5. To secure a relatively complete combustion of the fuel used through the co-active control of the air supply in volatilizing fuel, in burning the volatilized fuel and in controlling draft by the mechanical compression of or by an induction of the draft. 6. To secure the most effective and exhaustive transmission and utilization of the generated sensible heat through the use of the vertical counter-current travel of gases and water, applying the highest heat at high levels and progressively transferring the heat to water or air at progressively lower levels as the water or air travels upwardly, and in this way utilizing the force of gravity in securing economic heat transmission. 7. To secure the transmission of the power generated through the agency of an electric current. 8. To secure unification of the motive power of gas explosion and steam expansion in such manner as to avoid loss of energy in either source of motive power through unfavorable rates of motion in either motive generating means. 9. To secure economy in heat conservation by preventing the diffusion of generated sensible heat in gases, vapor or water before or while the process of heat transfer is occurring.

Other applied principles will be illustrated and exemplified in the particular description of the several features of the invention.

In the accompanying drawing, which diagrammatically represents a plant for the generation of fuel gas, the generation of the electric current and heat for heating, the reference characters represent as follows:—

A is a gas generator.
$A^1$ is a tar destructor.
$A^2$ is an electric gas current shifter.
$A^3$ are heating chambers.
$A^4$ is a duct for air.

$A^5$ is a tar vaporizer.
$A^6$ is a clock-work electrical regulator.
$A^7$ is an air control valve.
B is a gas cooler and condenser of tar and water vapor.
$B^1$ is an upper water chamber.
$B^2$ is a lower water chamber.
$B^3$ is a relief valve.
$B^4$ is a pump. $B^5$ is another pump.
$B^6$ is a cold well.
$B^7$ are water tubes.
$B^8$ is a pre-heated water pipe.
C is a scrubber.
$C^1$ is a pump.
$C^2$ is a scrubber well.
$C^3$ is a strainer.
$C^4$ is a water distributing sectional pan.
$C^5$ is a gas washer.
D is a gas exhauster and blower.
$D^1$ is a gas conduit leading from the blower D to the gas engine E.
$D^2$ is a by-pass device.
$D^3$ is a valve.
$D^4$ is a valve.
$D^5$ is a valve.
$D^6$ is a relief gas conduit to the steam generator furnace.
$D^7$ is a gas inlet.
E is a gas engine.
$E^1$ is radiating piping for cooling the jacket water and heating air.
$E^2$ is a gas exhaust pipe lined with non-conducting material which leads to water heater F.
$E^3$ is a compression relief valve for the gas engine cylinder.
F is a water heater for economizing the exhaust gases of the gas engine E.
$F^1$ is an exhaust gas conduit.
$F^2$ is a water conduit for heated water.
$F^3$ is a steam conduit.
$F^4$ is a compression reduction valve. $F^5$ is another compression reduction valve.
G is a steam generator.
$G^1$ is the furnace of the steam generator.
$G^2$ is the combustion chamber.
$G^3$ is a tubular steam boiler and water heater.
$G^4$ is a gas exhaust conduit.
$G^5$ is an upper gas outlet which is valve controlled.
$G^6$ is a lower gas outlet.
$G^7$ is an injection device for inducing a draft through the steam generator G and conduit $G^4$.
$G^8$ is a shell boiler.
H is a gas exhauster and blower operated from the motive shaft J.
$H^1$ is a compressed air supply pipe running to the furnace $G^1$.
$H^2$ is a compressed air conduit leading to the producer A.
$H^3$ is the air conduit leading to the injection device $G^7$.
I is a heated air conduit conveying air from a high level through the pipe $I^1$ to the air exhauster and blower H.
J is the motive shaft.
$J^1$ is a clutch.
$J^2$ is a drive pulley.
$J^3$ is a drive pulley.
$J^4$ is another clutch.
K is an air compressing pump.
$K^1$ is a compressed air pipe.
$K^2$ is an air expansion coil.
L is a multiple cylinder steam engine.
$L^1$ is a steam radiating piping and coil.
M is an electric generator.
N is a gas exhaust stack.
O is a by-pass conduit.
$O^1$ is an exhaust gas conduit.
$O^2$ is an exhaust conduit for occasional use.

A number of features which would be comprised in a plant of the kind illustrated have been omitted from the drawing, as for example; a gas pressure regulating and storage tank. A number of connecting pipe conduits have been broken away or omitted in the drawing for clearness.

*The gas producer.*—This may be of any suitable type, though I prefer to use the type of producer which is described and claimed in my co-pending application Serial No. 482,127, filed March 8, 1909.

*The tar destructor.*—When gasifying fuel which evolves much tar vapor, I may use the device $A^1$ for transforming the tar vapor into a fixed gas. This device is composed of two heating chambers $A^3$, which are charged with tar free coke, which is kept in a state of ignition, and through which the newly formed gas is alternately forced or drawn by mechanical means. By means of the electrically actuated shifting mechanism $A^2$, which is intermittently shifted through the action of electric motors controlled by the clock-work contact make-and-break device $A^6$, air and gas are alternately passed through the heating chambers. The coke is blown into a highly heated state by air forced through the inlet pipe $A^4$, and alternately forced through first one and then the other of the heating chambers. The heating of the coke is determined by the time of the blowing periods, which is in turn controlled by the clock-work device $A^6$. This device has a revolving hand which makes contact for predetermined periods at stated intervals with electrical connecting pins. The electrical current, which operates during periods of contact, operates the ratcheted motor shifting device $A^2$. While the fuel in one chamber is being blown into incandescence by compressed air, the newly generated producer gas passes through the other chamber, and is highly heated by contact with the ignited coke, or other fuel if used. This process frees the gas from most of the undecomposed tarry vapor.

*The gas cooler and tar condenser.*—The new gas passes into the top of the gas cooler and tar condenser B. In order to provide for the highest possible compression of the gas in the gas engine the gas should be cooled before entering the gas engine cylinder. The device now being described provides for the conservation of the heat that is transferred in the cooling of the gas, by a preliminary heating of feed water with high degrees of the heat of the new gas, and for the heating of air for combustion with low degrees of the heat. The device is composed of a lower water chamber $B^2$ into which cold feed water is forced and an upper water chamber $B^1$, out from which heated feed water passes, and connecting water tubes through which the cold feed water is forced upwardly, becoming gradually heated. On these water tubes such tarry vapor as passes out from the tar destructor is condensed, along with any water vapor in the gas. Provision is made for the disposition of the condensed matter by vaporizing it in the device $A^5$ and passing the vapor through the zone of combustion in the gas generator A, or it may be run into the scrubber well $C^2$. Or the combustible matter condensed may be separated from the watery elements and then otherwise used. The feed water primarily heated in this device passes out through the outlet pipe $B^8$, and is forced by the pump $B^4$ into the lower water chamber of the exhaust gas economizer water heater F. The pipe line connecting these two devices is broken in its course for clearness. There is a relief valve $B^3$, which allows of the introduction of a larger flow of cold water through the device B than would usually be needed for the generation of steam in the plant. This excess water passing out through the relief valve $B^3$ would be passed through a closed pipe radiating the acquired heat of the water in passing through the pipe and finally be conveyed into the cold well $B^6$. This connecting heat radiating piping is also omitted in the drawing for clearness. When a supply of water vapor for the producer is desired, I introduce the commonly used socalled preheater of small size between the producer and the gas cooler and condenser. That practice conserves the very highest degrees of heat carried by the newly formed gas, and such practice is an economy when the gas has been highly heated to free it from tar vapor.

The feed water is pumped by the pump $B^5$ from the cold water well $B^6$, and then more or less of the water heated in the device B is forced by the high pressure pump $B^4$ through the pipe $B^8$, the water heater F, and into the boiler $G^3$, entering the latter through the pipe $F^2$. The by-pass conduit O provides for the passage of gas from the tar destructor through the exhaust stack N. The conduit $O^1$ provides for the alternate passage of the exhaust gases to the exhaust stack N. The conduit $O^2$ allows for the passage of gases from the bottom part of the device B into the exhaust stack N, this conduit being brought into use when it is necessary to blow very hot gases through the device B in order to melt excessive amounts of tar adhering to the tubes $B^7$. The air pump K, which is driven from the shaft J, forces compressed air through the piping $K^1$ and through the coil $K^2$ in the well $B^6$. The compressed air loses its heat by radiation, and when expanded in the coil $K^2$, refrigerates the water in the cold well $B^6$.

*The scrubber.*—The scrubber C has a sectional water pan $C^4$ at an upper level into which water is pumped by the pump $C^1$ from the scrubber well $C^2$, circuitously. The water in this well is strained from ashy and other matters by the strainer $C^3$. The water being used circuitously in the scrubber enables larger volumes of water to be passed through the scrubber at a lower cost than if the water passing through the scrubber were allowed to go to waste. The scrubbing fluid becomes impregnated with ammonia, and then can be sold for fertilizer making purposes. It will be observed that the heat losses which usually occur in a producer gas power plant and which are lost between or in the producer and the engine, are in this instance economized in the primary heating of water, the lower degrees of heat being transferred by radiation to air, which with other amounts of heated air is economized in the burning of solid fuel in the furnace of the steam generator G.

*The gas washer.*—The gas passing upwardly through the scrubber C is then drawn through the gas washer $C^5$. This washer provides for the horizontal travel of the gas in counter-current to the passage of washing water through the device. The gas is washed through the action of a revolving shaft and connected fins, the shaft being actuated from the drive shaft J.

*The gas exhauster and blower.*—The relatively feeble and intermittent suction force of the gas engine is a poor reliance for the production of a satisfactory induced draft through the gas producer in the generation of the gas. Hence besides the pressure blower H I introduce in a system of this kind a gas exhauster and blower D actuated by a source of motive power outside of the gas engine. This draws a continuous flow of gas from the gas producer and forces it to the gas engine under a pre-determined pressure, which pressure is determined by the by-pass valve $D^2$. It is necessary to keep up a sufficient and uniform combustion in the gas producer to generate the heat that is necessary to volatilize the gas uniform in quantity and quality from the fuel used, and if the engine does not consume sufficient gas, part of the gas generated is by-passed to the atmosphere through the controlling valve $D^3$ and stack N, which would be especially the case when an inferior gas is being drawn from the producer after a stand-by. Or, it can be by-passed through the conduit $D^6$ controlled by the valve $D^4$ into the furnace $G^1$ of the steam generator G. In case the engine is using all of the gas generated to secure a uniform pressure of gas forced to the engine, the gas would be intermittently by-passed through the valve $D^5$ and through the blower D. In most cases this by-pass device would be connected with a pressure regulating tank holding more or less gas. This tank and its connections are not shown in the drawing for clearness.

*The gas engine.*—The gas engine may be of any suitable type, though in the composite generation of steam and gas power I prefer a single cylinder gas engine or battery of single engines because of lesser cost of construction, simplicity of management and efficiency in the use of fuel. I introduce a compression relief valve $E^3$ in the gas engine cylinder to ease the work of the steam engine L in initiating a working rate of speed in the gas engine. When speed is acquired the relief valve $E^3$ is closed and the force of the gas explosion exerts its full effect in keeping up motion in the fly wheels and performing work.

*The jacket water heat radiator.*—The heat of the jacket water of the engine is economized to heat air for combustion by radiating its heat through a closed pipe radiator designated at $E^1$. The special design of this radiating device may differ widely, but I usually apply in it the principle of transferring the highest heat of the water to air for combustion at a high level and progressively lower degrees of heat in the water to air for combustion at progressively lower levels.

*The exhaust gas economizer.*—The heat in the exhaust gases from the gas engine, or engines if a plurality are used is economized in the water heater F, which receives its water feed through the pipe $B^8$ from the top of the gas cooler and water heater B. The exhaust gases from the engine are forced through the conduit $E^2$, which is lined with non-conducting material to prevent radiation of the intense heat of the gases which are exhausted at a high level into the water heater F. This water heater is similar in construction to the device B, having upper and lower water chambers and connecting tubing. The feed water is forced upwardly through the device by the action of the pump $B^4$ and the gases forced downwardly therethrough by the exhaust stroke of the gas engine. The state of compression of the gases passing through the device is regulated by the valve $F^4$. The gases are not allowed to expand in this device, as the expansion of the gases would largely reduce the sensible temperature of the gases. By regulating the closure of the valve $F^4$ all the surplusage of kinetic energy developed by the engine E, or nearly all of it, may be transformed into sensible heat, and this in turn be transferred to water, generating water vapor and steam, which after being expanded in the steam engine L of the system, is in turn utilized for heating or other purposes. In this manner almost the entire expansive force of explosion can be applied indirectly in work through the auxiliary use of steam. Exhaust gases from the device F are passed through the conduit $F^1$ controlled by the pressure valve $F^5$ into the stack N, any unutilized heat being radiated from the pipe $F^1$ and transferred to air for combustion.

*The steam generator.*—I use steam power compositely with gas power in this invention for various reasons. In generating a cheap fuel gas, a certain definite rate of gas production has to be maintained in the generator to produce a gas that is combustible. The rate of production of the gas however may vary to a limited degree. Furthermore, a certain definite rate of speed in the gas engine must be maintained. This also varies, though to only a limited degree. It is very difficult to start a high pressure producer gas engine with the ordinary provisions for initiating motive activity in the engine, such as by using a large volume of highly compressed air. This is a very uncertain and unsatisfactory procedure. If the rate of speed of the gas engine is reduced by an overload or by the defect of a changed quality of the gas delivered to the engine, or through the quantity of the gas generated, the gas engine stops. By yoking up the immoderate, intractable and undependable gas power with separately generated steam power, these serious defects of gas power can be overcome. Furthermore, a motor, separate and apart from the prime mover, should be used for actuating the power motored gas generating and other motored elements, in generating the fuel gas and to bring the gas at a uniform rate of pressure to the engine. I prefer to use steam power for this purpose.

In a large number of cases where power generation is used, exhaust steam is desirable as a medium to use in heating; and through the composite use of gas and steam power the heat wastes of gas power can nearly all be economized in the generation of steam under pressure, while the heat of exhaust steam after exerting a pressure in power generation, can be utilized in steam heating;

or, the exhaust steam can be used to heat air for combustion; or, it may be used for producing motive power through the action of a condensing exhaust, as for instance with a low pressure turbine working condensing. The steam generator G here illustrated comprises a furnace $G^1$ with a controlled air-feed, both below and over the fuel mass. It has a combustion chamber $G^2$, which gives a long vertical run for the burning gases. Besides the cylindrical shell boiler $G^5$, which receives the highest heat of the burning gases, there is a boiler and water heater $G^3$ so constructed as to secure a vertical counter-current heating of the water with the gases from the furnace after their passage through the combustion chamber $G^2$.

The boiler and water heater $G^3$ is similar in construction to the devices B and F, having lower and upper water chambers connected by piping. The gases, after leaving the combustion chamber $G^2$ may be passed directly through the upper gas outlet $G^5$ into the gas conduit $G^4$, from whence the gases are exhausted into the stack N; or, the gases may be, and usually are, drawn downwardly through the boiler and water heater $G^3$ out through the lower gas exit $G^6$, and thence be exhausted through the injective effect of the injection device $B^7$ in the conduit $G^4$. The water level is the same in the water heater F and in the boiler $G^3$. In case I wish to give a high rating to the boiler, and especially if smoke forming fuel is used, I use a compression valve and introduce the air for combustion under higher pressure both below and above the fuel mass. This procedure uses more power but frequently it is economy to do so.

*The air exhauster and blower.*—Fresh air for respiration and combustion is introduced into the plant at a low level thereof and is progressively heated by radiation from the radiating surfaces, and rises to a high level above the plant to the air conduit I, which would preferably be located at the highest level of an apical concavity, such as the space under a peaked roof, from whence the warm air is drawn in a downward flow through the conduit $I^1$ to the exhauster and blower H, which is actuated by belting from the motive shaft J. This method of saving heat is specifically shown and claimed in my copending application Serial Number 415,983, filed February 14th, 1908. The warmed and compressed air is driven through the air conduit $H^1$ to the furnace $G^1$, where it supplies a controlled air feed, both below and above the fuel mass in the furnace. Warm air may be blown through the conduit $H^3$, and through the injection device $G^7$, which induces a draft through the conduit $G^4$, and which exhausts into the stack N. Air is further blown through the air conduit $H^2$ underneath the gas producer, the amount of air being controlled by the valve $A^7$; and into the tar destructor through the conduit $A^4$.

*The steam engine.*—Steam being generated in the heater F, the boiler $G^3$ and the boiler $G^8$, is conveyed by the pipe $F^3$ to the multi-cylinder steam engine L, which controls the initial motor activity of the plant, the motive power being conveyed by belt from the engine L to the shaft J through the pulley $J^2$. Steam being generated under pressure by starting a fire in the furnace $G^1$, the engine L is started, which in turn rotates the drive shaft J. Motion is communicated from this drive shaft to the blower H, to the shaft of the gas washer $G^5$, to the exhauster and blower D, to the pump $C^1$, to the pump $B^4$ and to the pump K. Gas is drawn by the action of the blower D, driven by the shaft J, and after a certain amount of blowing of the producer A, gas when of a proper quality and properly cleansed, is forced to the gas engine E. The relief valve $E^3$ being opened, motion is communicated to the gas engine from the shaft J by the clutch $J^1$, and after the gas engine has attained the proper speed the relief valve $E^3$ is closed and gas is admitted to the engine and is exploded in the usual way. The connecting pulleys between the engine L and the shaft J, and between the engine E and the shaft J, are so differentiated as to size as to secure a favorable rate of rotation in both the internal combustion engine and the steam engine if the two engines are to be run in unison. The two sources of motive power may be run together continuously, or the steam engine may be disconnected from the motive shaft J by the clutch $J^4$, or more or less steam power motivity may be added to the gas power motivity by varying the rate of combustion in the furnace of the steam generator. In this way the defects and disadvantages of gas power may be overcome by uniting the two powers and controlling the gas power by the more tractable force of the steam.

It will be understood that in large installations a plurality of gas engines may be used because of the inherent difficulty of using very large gas engines. In such cases it will be obvious that one boiler containing and storing superheated water and one steam engine will be all that is needed to successively start all of the gas engines. Each gas engine being started or controlled by clutch or other connection. I prefer to use a ratcheted clutch attached to the gas engine shaft, but an electrical motor or other connection can be used. When a number of gas engines are used each one will drive its only electrical generator, the combined power being unified by synchronous action in all the engines or by an electrical accumulator from which the power would be drawn and transferred by electrical motor to either a single drive shaft, or to the main shaft of a shaft system.

*The electric generator.*—It will be understood that the motive power generated in the manner described may be used directly without any generation of the electric current; or, the power generated may be transmitted electrically.

M represents any convenient type of electric generator, from which the electric current is conducted to places of use. The internal gas engine might, and usually would be directly connected with a suitably wound electric generator, instead of exerting its power indirectly through the shaft J. When the alternating current would be generated, provision would be made to secure synchronous rates of speed in all of the engines of the plant.

*Utilizing exhaust steam.*—The exhaust steam from the auxiliary motor L would be used when desired for heating, a heating system being represented by the piping and coil $L^1$; or, the heat of the steam may be radiated and transferred to air for combustion, which with other amounts of heated air would be used in burning fuel in the furnace of the steam generator. In cold weather more of the steam would be used in heating. While in summer most of the waste heat would be used regeneratively in generating power.

*The air heating system.*—It will be noted that the various heat radiating pipes would be arranged in such manner underneath the hot air conduit I that the air would be gradually heated by radiated heat of progressively increasing temperatures. The gases of highest temperature emerging from the boiler $G^3$ would be radiated in the pipe $G^4$, giving the air for combustion its highest heating.

From what has now been said it will be noted that a very considerable part of the heat energy originally stored in the fuel used in the producer A, and not used in the direct production of kinetic energy in the gas engine, is largely economized in heating water and forming steam, which is first used expansively in the engine L, and finally utilized either in heating, or used regeneratively in the creation of fresh supplies of steam under pressure. It will be understood that if the steam is not otherwise used from the engine L, it can be further used in a low pressure turbine run condensing, and that the heat of the water of condensation and of condensing water could also be transferred to air for combustion or respiration, and that all the water would be returned by conduits, not shown in the drawing, to the cold well $B^6$, being used in cycle.

It will be noted that feed water is first cooled by the action of liberated compressed air. After first using the feed water to condense tar, it is gradually heated and receives its highest primary heat in the top of the device B. It is then given a secondary heating in the water heater F, and is given its highest and final heating in the boilers $G^3$ and $G^8$.

The breadth of the inventive ideas comprised in this invention must be considered as including the proposition of controlling the immoderate and undependable activity of the explosive burning of the gasified, vaporized, or finely comminuted dust fuel in an internal combustion engine through the agency of a separately engendered active force more or less accumulated and stored, and applying this accessory force in a more continuous and gradually exerted outgo of the accessory force in connection with the immoderate force of explosion, as modified to the work actually to be done. This proposition can be carried out by having the gas engine generate an electric current and then applying the current through an electric motor to the driving of a working shaft, such for example as the shaft of a propeller, either directly or indirectly from a storage battery. This proposition can be improved by having the energy of the gas engine under the control of the stored electric energy. This matter of control refers particularly to starting the engine, to making the rate of speed of the engine vary as to rapidity over large rates of speed, of keeping up the revolutions of the engine during lower rates of speed over the full cycle of the engine, and overcoming by means of the accessory power, the force of compression and the force of expulsion of the burned gases. By proper modification of structure more or less of the force exerted in an auxiliary manner can be applied to supplement the activity of the gas engine, and when the gas engine is doing full work, such auxiliary energy can be cut off more or less as economy requires. The same general idea of using an intermediate medium for transmitting the power from the immoderate gas engine to the motored elements, can be applied by having the gas engine actuate a rotary or other pump, propelling a power transmitting fluid, and have the fluid drive the motored shaft. This can be performed directly, or the fluid can be forced into a compression tank and more or less force accumulated, which in turn would be hydraulically exerted in driving the motor shaft of the working element. Air alone could also be used as an intermediary power transmitting agent between the gas engine and the motored element. I prefer to use steam in this connection, because water has the property of absorbing so great a quantity of heat energy, and because with the use of steam it is possible to utilize nearly all the waste heat of the gas engine. This heat waste can be accumulated through the mechanical compression of water vapor by the energy of the gas engine, accumulating the energy by storing it in the shape of superheated water, from which the energy can be drawn by flashing the super-heated water into steam to drive the motored shaft. Or, the energy of the gas engine may be transferred to stored hot water by forcing the exhaust gases of the engine through a water heater under a regulated pressure, and thus giving the water in the heater a super-heat of any desired degree, from which superheated water steam can be used in driving the motor shaft. The motored shaft can be actuated by one or more gas cylinders and one or more steam cylinders or turbine motor; the general idea being to control the general activity of the gas engine through the activity of an accessory force of a different character applied in unison with the force of gas explosion. It will be noted that this idea is different from the idea of using steam generated by the heat wastes of the gas engine but which is not exerted by a control separate from the activity of the gas engine. The jacket water may be used indirectly to heat the feed water; or be used directly as feed water.

*Compression draft.*—The invention herein illustrated and claimed is not confined to the special structural combination shown in the drawing. Because of the heat economization possible, I prefer to use the combination of gas power and steam power; but there are cases in which this becomes undesirable and even impossible. For example in large naval vessels, because of the essential requirement of heavy weight in armor and guns, it is impractical to use producer gas power either alone or in combination with steam power on account of the great weight of the various devices it would be necessary to install. Furthermore, there are many steam plants already installed which for economically prudential or other reasons it would not be desirable to alter or replace by gas power or composite gas and steam power. This is specially so in those cases in which a large amount of heating is required. In such cases I apply the present invention in part, eliminating the internal combustion engine, but combining the gas producer and the steam generator and furnace in one device, to which I attach an economizer for either heating water, or air for combustion with the low degrees of heat that have passed out of the boiler. In such cases I force air for combustion under unusual heavy pressures underneath the grate of the furnace in sufficient quantities to secure the volatilization of the fuel, and force air also under high pressure above the fuel mass, close to the top of the fuel, in many small currents. At the exit of the gas passages of the boiler, I affix a gas tight controlling valve, such as a gate valve, through whose functions I can command any adequate degree of high pressure within the combustion chamber and gas traversing passages of the device. Furthermore, I apply another valve at the exit of the special economizer used, in order to control and maintain a high pressure in the gas passages of the economizer. It should be understood that in a device of this kind, the whole incasement of the apparatus, including the fuel feed and ash pit doors, would be substantially impervious to the exit of the gases of very high pressure within the device. The amount of pressure applied in such circumstances would depend upon special conditions present; but whereas under ordinary forced draft it would be in multiples of inches of water pressure, the high pressure exerted in my invention would be measured in pounds. The principle to be carried out, is to prevent drop in gas pressures in the device, with consequent expansion of the gases, which would necessarily be accompanied by a serious decline in the sensible heat of the expanded gases, until the heat transfer to water or to air is effected. I am aware that something of the nature of this performance has been tried before, simply by the closing of an ordinary damper, and with ordinary forced draft; but such performance has failed to secure my results because of a non-recognition of the principles now newly applied, and because of unsuitable structure for accomplishing my results. Under such conditions, the forced draft has been usually entirely through the fuel mass, and a considerable part of the volatilized gases have been quickly wafted into contact with the heating surfaces of the boiler, and then the gases have been allowed to expand before they have reached the exhaust conduit or stack for the gases. In such cases there is an incomplete combustion, and a lesser amount of heat absorbed than with my method. An ordinary damper is only available for controlling induced draft, and to a very moderate degree for securing increase of internal pressure in the boiler, and is ordinarily not a gas tight device.

It is impossible to carry out with an ordinary damper the procedures of my invention. With my method I secure the ability to obtain in the one device the practically complete, smokeless combustion of any kind of fuel, hard or soft, the degree or height of pressure determining the amount of heat required to secure the volatilization of the fuel. With my method I force only a moderate amount of air through the fuel, and if necessary to preserve the integrity of the grate structure, I introduce under the grate an endothermic product such as steam or waste burned gases. The air for combustion above the fuel mass, and the high pressure maintained in the gas passages of the boiler, secure a complete combustion of the volatilized gases at the low level at which the over fuel mass air for combustion is introduced. Combustion being thus effected, and by securing the transmission of the sensible heat of the outgoing gas under high pressure, it will be found that when the gases expand after passing over the heat absorbing surfaces, while the temperature of the gases on one side of the compression exit valve may be sensibly high, immediately after their exit the sensible temperature that is apparent is from only one-third to one-quarter of the apparent sensible temperature of the gases in the compressed state. To illustrate: Under a certain high pressure, as the gases emerge from the boiler they may have a temperature of 400° F. but after their expansion to atmospheric pressure the temperature may be found to be only about 100°; the proportion of the amount of heat transferred depending upon the degree of compression of the gases in the device. In this way large volumes of low degrees of heat can be saved, which are now universally wasted. The cost of compressing the air introduced, depends upon the pressure exerted; but under ordinary working conditions is only a minor part of the savings effected through securing a relatively perfect combustion of fuel. Economy is also exercised through ability to use grades of fuel that would otherwise not be practicable.

*Multiplication of cylinders in securing tractability in the use of producer gas* *power.*—The drawing here illustrates the invention as it would ordinarily be applied in a large stationary power plant, in which the rate of speed generated by the prime mover of the plant would be substantially uniform. But in applying my invention to those cases, as in marine propulsion where the gas engines now in use are not practically usable, and in which a large variation in rates of speed is necessary, tractability would be attained by the use of a number of gas cylinders applied to the propeller shaft of the vessel, and each one of these cylinders would be provided with a gas throttle, a relief pressure valve, and a clutch or other means for connection or disconnection with the propeller shaft. Otherwise than this, the shaft would be under the control of steam power generated in part at least from heat evolved outside of the heat that has been generated in the gas engine. To secure perfect control, a multiple cylinder steam engine would be used, all the cylinders being preferably operated under high steam pressure. The connection between the steam engine and the propeller shaft would be by direct connection with the shaft or by a chain belt or other speed reduction connection. In this connection it may be noted that the waste steam from the steam engine and the steam made from the exhaust heat of the gas engine can be utilized in a steam turbine run condensing. Special means would be provided for quick stoppages of the gas engine and steam engine and for a reversing motion in the propeller shaft by the use of the steam engine in connection with some form of reversing mechanism. In connection with an installation of the kind here illustrated, I would install a peaked ceiling space, or apical cavity, over the installation, to catch, hold and prevent heat diffusion in the rising air heated by the radiated heat of the installation. This feature is claimed in my co-pending application Serial No. 415,983.

The relation of this invention to producer gas power in connection with overcoming the defects and limitations of that power, should be emphasized and very clearly defined. In theory, producer gas power is about four times as efficient in the use of fuel as ordinary steam power; but that theoretical advantage has been largely impossible of practical realizations owing to a number of defects inherent in ordinary producer gas power. Among these defects are: (1) the poverty of producer gas in burnable heat units. This quality in the gas necessitates the practice of a high compression of the gas in the gas engine cylinder, which need in turn makes the initiation of motive activity in the engine a very difficult matter. Generally the use of stored large volumes of very highly compressed air is needed to start the engine and this force must be applied with high skill. The results are usually very uncertain. An outside source of power is required to start the engine, and that source of power should be initially as much or more than that which is developed by the engine itself. In very small producer gas engines, hand power can be applied in starting them; but with large engines, compressed air, electric power or steam power must be applied. Such power to be satisfactory, must be capable of being exerted gradually and persistently until sufficient momentum and self sustaining motive power is developed in the gas engine itself.

(2) The rate of speed and desired momentum in the gas engine must be sufficiently continuous, otherwise motion in the engine ceases. Furthermore, overloading the engine, with a decrease in the momentum of the engine, stops it. Unless there is an outside source of power generated initially and maintaining motive energy that is accessory to that of the gas engine, and which can be applied in control of the gas engine, that low cost source of power is largely impractical to use. (3rd) To be satisfactory the production of the fuel gas must be initiated and maintained by a source of power outside of the power of the gas engine. In order that a superior quality and adequate quantity of gas be produced, it is necessary to have the gas produced under the control of a power separate and apart from the power generated by the gas engine. The production of the gas must be continuous in order to maintain a sufficiently intense heat in the producer, and without close relation to the varying loads carried by the gas engine. (4th) In gas power installations it has been found very difficult to operate very large gas engines owing to difficulties connected with effecting ignition of the gas in the engine cylinder, and in connection with controlling overheating of the cylinder and other parts of the engine. In my practice, to overcome these difficulties I use a number of smaller cylinders, and unify the force of several cylinders by various methods. I show one such method in Patent No. 883809, issued April 7th, 1908. In the present application I illustrate how the energy of several power generating units can be united by having each unit drive its own electric generator and then combine the several powers generated in one electric accumulator from which can be drawn a working current. Under such circumstances each power unit will develop its best efficiency without being interfered with by other acting units running at different rates of speed. By dividing the units, it is more easily possible to locate defects of action in any particular part of an installation. Being cognizant of these facts, it becomes apparent that in this invention I specifically apply new structural features and new combinations to secure new results in economical motor power production, whether that power is generated from gas explosion combined with the aid of steam, or through the use of steam alone.

This application discloses a method which furnishes the subject matter of a separate application, Serial No. 676,716, filed February 10th, 1912.

What I claim as new is:

1. The combination of, (1) a producer gas generator, (2) an internal combustion engine comprising a water jacket for using the gas generated, (3) a steam generator for generating steam, (4) a steam motor actuated by the steam generated, and (5) means exemplified by a shaft, pulleys, belts and clutches for unifying or entirely disconnecting at will the motive activity of the internal combustion engine and the motive activity of the steam motor, said means starting and controlling the rate of motion of the internal combustion engine by means of the steam motor, said steam generator being entirely separate and independent of said internal combustion engine.

2. The combination of, (1) means for generating combustible gas, (2) means for generating motive power from the burning of the gas under compression, (3) means such as a reduction valve for maintaining in a state of compression and for controlling the degree of compression of the hot burned gases and for transferring heat in the compressed hot gases to air, and (4) means for utilizing in useful work the air thus heated.

3. The combination of, (1) a gas generator, (2) means for cooling the gas newly generated and for pre-heating feed water in the cooling of the gas and condensing tarry and other vapors in the new gas, (3) means for generating motive power by burning the gas generated, (4) means for the high heating of the pre-heated water with the exhaust gases from the means for generating motive power, and (5) means comprising a steam engine connected with said third named element for utilizing in useful work steam disengaged from the water thus successively heated.

4. The combination of, (1) a producer gas generator, (2) a mechanically actuated gas exhauster and blower for inducing a flow of gas from said gas generator and for forcing the gas to a gas engine, (3) said gas engine for using the gas, (4) a furnace and boiler for burning fuel for heating water and generating steam, (5) means comprising a by-pass device connecting said exhauster and blower and said furnace for diverting excessive amounts of the gas generated in the gas generator but not used in the gas engine, to said furnace for burning in said furnace, whereby said excessive gas is economized.

5. The combination with a place for the economic burning of producer gas of, (1) a producer gas generator, (2) a gas engine for using the gas, (3) a mechanically actuated exhauster and blower for exhausting gas from said gas generator and for forcing the gas to said engine for use therein, (4) a device comprising a two way means and a by-pass relief valve for by-passing at will excessive gas generated in said generator but not used in said engine to either said place of economic burning or to the atmosphere without burning, and (5) means for directing the by-passed excessive gas to the place desired.

6. The combination of, (1) a producer gas generator, (2) an internal combustion engine for using the gas, (3) a steam generator for generating steam, said steam generator being separate and independent from said internal combustion engine, and a steam motor operated by the steam generated in said generator for developing motive power independently from the power generated by the internal combustion engine, said steam motor being connectible with and disconnectible from and initiating motion in and otherwise controlling at will the motive activity of the internal combustion engine, and (4) a pressure relief valve for the internal combustion cylinder for relieving high pressure in the cylinder while the motive activity of the internal combustion engine is being inaugurated under the control of the steam motor, said relief valve enabling the motive activity of the gas using engine to be initiated by a steam motor of lesser size and using less steam than if the entire pressure in the gas cylinder would have to be overcome in initiating a working speed in the internal combustion engine.

7. The combination of, (1) a gas generator, (2) an internal combustion engine for using the gas generated and generating a flow of motive energy, (3) a steam generator for generating steam from the burning of fuel not burned in said internal combustion engine, (4) a steam motor actuated by the steam generated for generating a flow of motive energy, (5) means exemplified by a shaft, pulleys, belting and clutches for connecting the steam motor with said internal combustion engine for modifying and controlling the activity of the internal combustion engine through the motive force of the steam motor, the two flows of motive energy generated by the internal combustion engine and the steam motor being separately and independently engendered, and (6) means exemplified by structure comprising an electrical generator for uniting in one outflow of motive energy the motive energies dually generated.

8. The combination of, (1) a gas generator, (2) a gas engine for using the gas, (3) a steam generator comprising a furnace, (4) a steam engine for using the steam, (5) means for uniting in work the motive energy of the gas engine and the motive energy of the steam engine, (6) radiating pipes and surfaces radiating the waste heat of the gas making, the waste heat of the gas engine, the waste heat of exhaust steam, and other waste heat, said radiating piping and surfaces being so arranged that heat of low degrees of intensity is transferred to air of low temperature and that the air is progressively heated by waste heat of increasing temperatures, and (7) means for utilizing the air most highly heated by collecting and conveying the highly heated air to said furnace for purposes of combustion.

9. The combination of, (1) means for generating a combustible gas, (2) means for generating motive power from the burning of the gas, and (3) means for transferring to air for combustion radiated sensible heat generated by the two first named means, said last named means being exemplified by heat radiating piping, an exhauster and blower, and a furnace and boiler, said last named means using regeneratively in the generation of motive power the air heated by the said transfer of heat made sensible in generating said combustible gas and in generating motive power from the burning of the gas.

10. The combination of, (1) means for the generation of a combustible gas, (2) means comprising a steam boiler for the generation of motive power from the waste heat and generated but unused gases from said first named means, said second named means comprising provision for intercepting air heated by radiated waste heat and intermixed with generated gases escaped from said combination and mechanical means for conveying said heated air and escaped gases to a place of combustion for purposes of combustion, and (3) said place of combustion.

11. The combination of, (1) means for generating heating gases, (2) means for generating motive power from said heating gases, (3) means for exhausting the gases from the second named means and for radiating to and heating air for combustion with the heat of the exhaust gases and for cooling the exhaust gases to a temperature slightly higher than the temperature of the atmosphere into which the gases are exhausted, and further means for making a mechanical draft or for securing a natural draft for the gases, and (4) means for utilizing for purposes of combustion in said combination the air heated by the radiation of the heat in said gases, said last named means comprising a heat interchanging provision through which gases and water are passed vertically in counter current the one to the other.

12. The combination of, (1) means for generating a combustible gas, (2) means for super-heating the gas for cleaning said gas from tarry or other vapors, (3) means for cooling the gas and condensing contaminants in the gas by contact with cool heat absorbing surfaces, (4) an internal combustion engine actuated by the cooled gas, (5) means for generating electromotive force from the motive activity of the internal combustion engine, (6) means for generating steam from the heat wastes of said combination and for generating further electromotive force from said last named means, and (7) means for uniting in one outflow of energy the two outflows of generated motive force.

13. The combination of, (1) means for generating a combustible gas, (2) means comprising a boiler and furnace for burning the gas under controlled pressure and generating motive power from the heat of the burning, said boiler and furnace having an exit for exhaust gases and means connected with said exit for controlling the rate of passage of the gases therethrough and controlling the gas pressure in said boiler and furnace, (3) means for transferring some of the heat in the burned gas to air for combustion, and (4) means comprising an air exhauster and blower and distributing valves for feeding the heated air at will and under controlled pressure to said means for burning the gas.

14. The combination of, (1) a gas producer and a gas engine for using the gas produced, (2) means for generating steam and a steam engine actuated by the steam generated, (3) means comprising radiating piping for heating air for combustion with the heat wastes of the elements of the combination, (4) means comprising a compressor for compressing the air heated and for forcing the compressed air to the means for generating steam, whereby the forced air is used for purposes of combustion, (5) means exemplified by a shaft, clutches and connected parts for controlling the motive activity of said gas engine by the motive activity of said steam engine, and for conveying motive activity to the means for compressing and forcing the heated air, said cited means comprising mechanism for introducing and controlling the amount of heated air used in said means for generating steam both below and above the fuel burned in the means for generating steam, and (6) means exemplified by valves for controlling the degree of pressure of the burned gases in said means for generating steam and in said means for heating air for combustion.

15. The combination of, (1) a gas generator, (2) a gas engine for using the gas generated, (3) a source of power separate and independent from the gas engine, (4) an air blower connected with the independent source of power, for blowing air and burned gases through the gas generator, (5) means exemplified by an induction fan and blower for inducing a flow of gas from the gas generator and for forcing the gas to the gas engine, and (6) means connected with the independent source of power for transferring motive activity from said source of power to the air blower to the means for inducing and forcing the flow of the gas and also for initiating motion in and controlling motive activity in said gas engine.

16. The combination of, (1) an internal combustion engine, (2) a generator for generating steam, (3) a steam motor actuated by the steam generated, (4) a motive shaft connected with the steam motor and means for securing revolution in said shaft, said combination comprising mechanism exemplified by a multiple cylinder steam engine for applying continuously and directly the expansive force of steam in revolving said shaft, and (5) means for conveying at will to said internal combustion engine the motive activity of said shaft and for varying at will the rate of speed of the united motive activity in said shaft and in said internal combustion engine, said steam motor comprising the ordinary mechanism of a steam motor for automatically feeding steam from the steam generator to the steam motor according to the load met and carried by the steam motor.

17. The combination of, (1) means for generating steam under high pressure, said steam being generated separately and independent from any other source of expansive power, (2) means for initiating and maintaining motion in a shaft through expansion of the steam, (3) means for developing increased motion in the shaft through the burning of the fuel under mechanically produced compression, (4) means for generating steam and developing motion from steam generated from the heat wastes of the means for burning fuel under mechanically produced compression, and (5) means for uniting the last and first named developed motions.

18. The combination of, (1) a gas generator, (2) means comprising a fan and a pump for generating motive power from the gas and for the mechanical conveyance of the gas and for forcing cooling water, (3) means exemplified by a condenser for cooling and condensing contaminants in the gas with the forced cooling water, (4) mechanical means for refrigerating the cooling water, (5) a steam generator and steam engine connected with and for actuating the second and fourth named elements, and (6) means comprising radiating piping, an air fan and air conduits, for utilizing in said combination the waste heat made sensible in refrigerating the water.

19. The combination of, (1) means for generating high pressure steam and for developing motive power in a shaft from the high heat of the steam, (2) means for securing the regenerative utilization of the low degrees of heat in the steam in the combination, (3) means comprising an internal combustion engine for generating auxiliary motion in the shaft, said internal combustion engine exhausting hot gases, (4) means comprising a vertical counter-current water heater for forming steam from the exhausted hot gases, and (5) means for applying the last named steam in work harmoniously and in unison with the motive work otherwise performed in the combination.

JOSEPH MOSES WARD KITCHEN.

Witnesses:
NATHANIEL EPSTEIN,
GEO. L. WHEELOCK.

Copies of this patent may be obtained for five cents each, by addressing the "Commissioner of Patents, Washington, D. C."